[11] 3,609,590

[72] Inventor James L. Jernigan
Inyokern, Calif.
[21] Appl. No. 884,093
[22] Filed Dec. 11, 1969
[45] Patented Sept. 28, 1971
[73] Assignee The United States of America as represented by the Secretary of the Navy

[54] EXPANDED LASER BEAM OUTPUT
4 Claims, 4 Drawing Figs.
[52] U.S. Cl. .................................................... 331/94.5, 350/169
[51] Int. Cl. .................................................... H01s 3/08
[50] Field of Search ....................................... 331/94.5; 350/160, 169; 356/106

[56] References Cited
UNITED STATES PATENTS
3,508,166  4/1970  Simmons et al ............... 331/94.5

*Primary Examiner*—William L. Sikes
*Attorneys*—R. S. Sciascia and Roy Miller

ABSTRACT: A laser utilizing two 100 percent reflective surfaces and a prism positioned in the laser cavity between the reflective surfaces. A majority of the beam is reflected off one side of the prism and directed to a reflective surface where it reflects toward the prism while the rest of the beam is transmitted through the prism to form an elliptical output beam.

PATENTED SEP 28 1971   3,609,590

INVENTOR.
JAMES L. JERNIGAN
BY
ROY MILLER
ATTORNEY.

EXPANDED LASER BEAM OUTPUT

Government Interest

The invention described herein may be manufactured and used by or for the Government of the United States of America for governmental purposes without the payment of any royalties thereon or therefor.

BACKGROUND OF THE INVENTION

In the field of expanded laser beams, it has been the general practice to employ a prism placed outside the laser cavity beyond the output opening to alter the circular output beam shape (FIG. 1). Such devices have been unsatisfactory in that many prisms are necessary for large expansion ratios, and only a small percentage of the beam power passes through the prism and is useable while the majority of the beam is reflected off the prism surface and lost.

The object of this invention is to provide a cheaper and more efficient expanded laser beam output.

DESCRIPTION OF THE PREFERRED EMBODIMENTS

Figure 1:
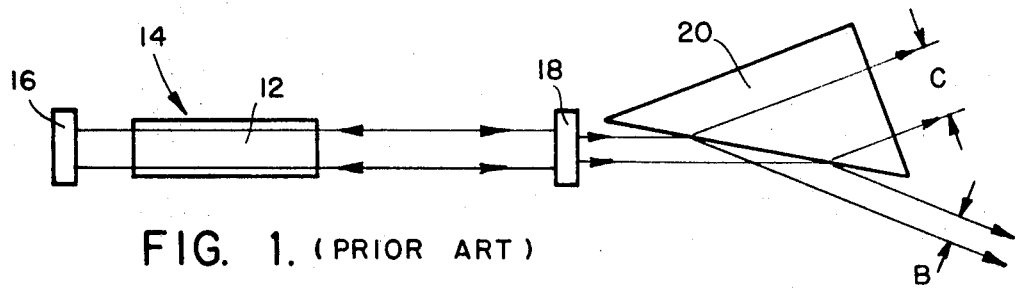
FIG. 1 is a plan view of a prior art device.

Referring now to FIG. 1, there is shown a prior art device wherein the prism 20 is placed outside the laser cavity. A portion of the beam striking the prism surface is transmitted through the prism and thereby expanded. The remainder of the beam is reflected off the prism surface and lost. To obtain a significant expansion the beam must intersect the prism surface at a large angle of incidence. As the angle of incidence is increased, thereby increasing the amount of expansion, more of the beam is reflected and lost.

Figure 2:
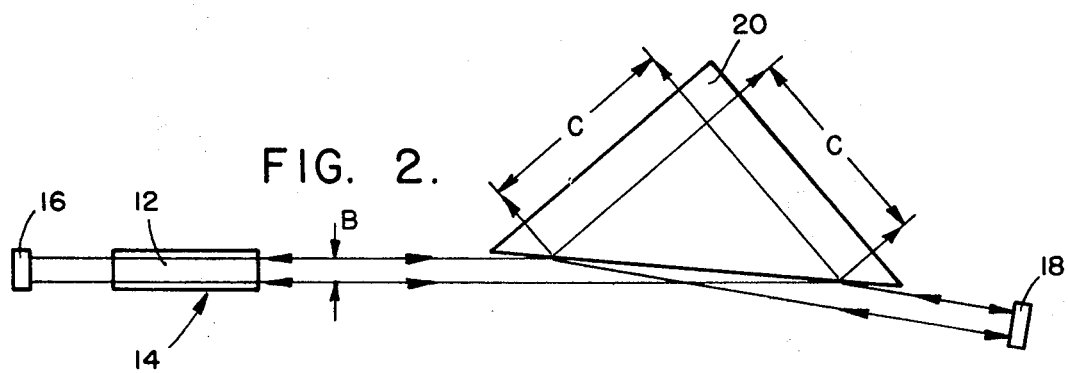
FIG. 2 is a plan view of one embodiment of the invention.
Figure 3:
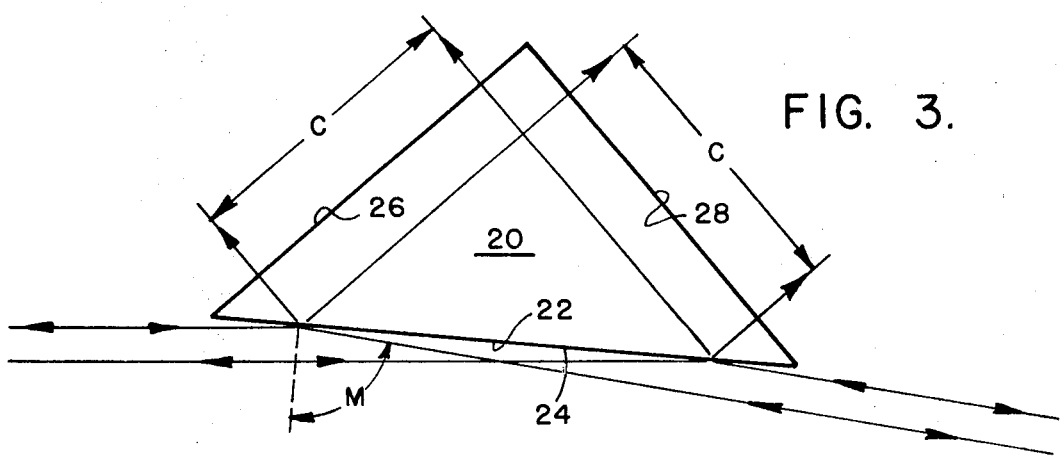
FIG. 3 is an exploded schematic of the prism of FIG. 1

Referring now to FIG. 2 and FIG. 3, there is shown an apparatus for producing an expanded laser beam output as per invention. The apparatus generally comprises an active material 12, a pumping source 14, a pair of reflecting surfaces 16 and 18, and a prism 20. The active material 12 and pumping source 14, can be of the types used in any standard laser. The reflective surface 16 and 18 can also be of the types used in any standard laser except that both surfaces are ideally 100 percent reflective. The prism 20 is constructed of any suitable material or materials chosen to achieve a desired amount of refraction and reflection. In addition to, or as an alternative to, prism material selection, reflectivity may be selected by coating the wave receiving surface 22 with a suitable interference facing 24, such as a magnesium fluoride coating on a quartz prism surface. The facing 24 is designed to provide sufficient beam reflection to maintain oscillation between surfaces 16 and 18.

Minimal-exiting beam compression is accomplished by selecting the prism shape such that the beams exit normal to the surfaces 26 28.

The prism 20 is positioned slightly offset from a straight line between the reflective surfaces 16 and 18. The offset distance is determined by the type of laser being used, the reflectivity of the prism and facing, if a facing is used, and the exiting beam width desired.

Prism surface 22 is oriented to deflect the oscillating laser beam to the reflective surfaces 16 and 18. An angle of incidence M is formed between the beam striking the prism surface 22 and a line normal to the surface 22. The width of the expanded exit beam, C, written as a function of the angle of incidence M and the width of the incident beam, B, is:

$$C = \frac{B\sqrt{n_2^2 - n_1^2 \sin^2 M}}{n_2 \cos M}$$

where $n_1$ and $n_2$ are the indexes of refraction of the material through which the beam is traveling, and of the prism, respectively.

In operation, light is developed in the cavity by the active material 12 and the pumping source 14. A beam is established by maintaining oscillations of a portion of this light between reflective surfaces 16 and 18 placed at each end of the resonant cavity. A small percentage of the beam is transmitted out of the cavity by causing the beam to strike a prism surface 22 at a large angle of incidence M. The angle of incidence M is sufficient to reflect approximately 90–99.9 percent of the beam off the prism surface 22 and direct it toward the reflective surface at one end of the cavity. Each of the reflective surfaces 16 and 18 is oriented to face the prism surface 22 rather than the other reflective surface.

The necessary percentage of beam reflection off the prism surface 22 to maintain oscillation, and thereby laser operation, is determined by the active material 12 being used. For example, if we ignore losses in the reflective surfaces 16 and 18, the argon ion laser requires 94 percent reflection off the prism surface to maintain laser operation. The portion of the beam directed toward the reflective surface at one end of the cavity is reflected at that surface back along the same path to the prism surface 22 where the process occurs again, with the portion reflected off the prism surface this time directed toward the reflective surface at the other end of the cavity.

Since each oscillation of the beam intersects the prism surface 22 twice, and a portion of the beam is transmitted through the prism each time the percentage of the beam that may be removed and still maintain laser operation. For example, if we ignore losses in the reflective surfaces 16 and 18, 3 percent of the beam may be transmitted through the prism on each pass if the active material is argon which requires 94 percent of the beam to be reflected to maintain laser operation. The percentage of beam reflection off the prism can be increased by increasing the angle of incidence M or by coating the surface with an interference facing 24.

Since the beam is oscillating, an exiting expanded beam is obtained from surface 26 as the oscillating beam travels from right to left, and an identical exiting beam is obtained from surface 28 as the oscillating beam travels from left to right. If a single exiting beam is desired, one of the surfaces, 26 or 28, can be provided with a reflective layer to rebound its incident beam back through the prism to the reflective surface 16 or 18 from which it came, and thereby back into the oscillating beam.

Figure 4:
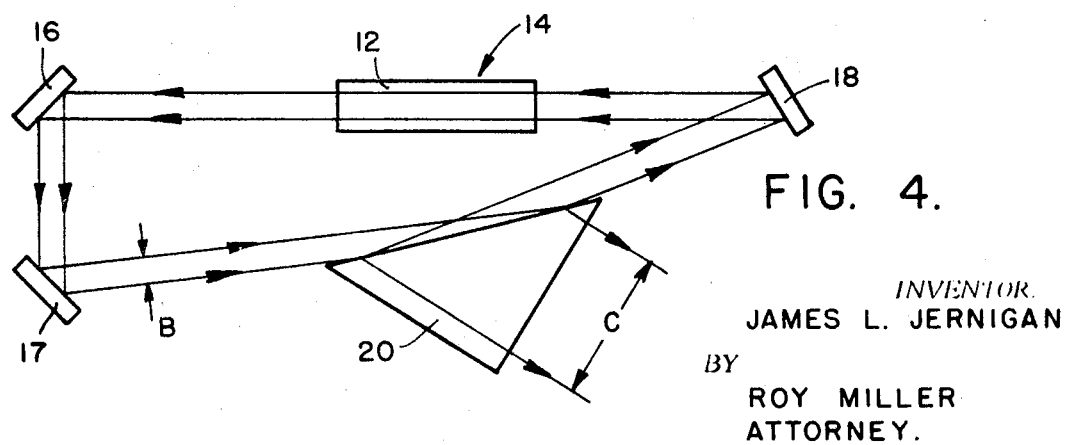
FIG. 4 is a plan view of another embodiment of the present invention in a traveling wave laser.

Referring now to FIG. 4, there is shown a traveling-wave laser utilizing the present invention. Members 16, 17, and 18 are the reflective surfaces and member 20 the prism. In this embodiment the wave is traveling in one direction, and therefore only one exiting beam is obtained.

In all cases the portion of the beam not transmitted through the prism and expanded is preserved within the cavity to maintain laser operation.

What is claimed is:
1. A laser comprising:
    a resonant cavity;
    an active material within said cavity;
    means in said cavity causing said active material to initiate and maintain a beam;
    a reflective surface at each end of said cavity; and
    a prism disposed within said cavity for expanding said beam and providing said expanded beam as a system output, wherein a surface of said prism is positioned in the path of said beam and said surface is oriented to reflect a portion of said beam, and transmit a portion of said beam through said prism such that said transmitted portion is said expanded beam.
2. The combination of claim 1 wherein said reflective surfaces are beam nontransmissive.
3. The combination of claim 1 wherein said reflecting prism surface is coated with an interference facing.
4. The combination of claim 1 wherein a prism surface from which the said transmitted beam exits is perpendicular to said transmitted beam.